April 17, 1951 R. F. STEHLIK 2,549,719

EXECUTIVE'S AND SECRETARY'S TRUNK CONNECTIVE INTERCOMMUNICATION AND SIGNAL SYSTEM

Filed Sept. 12, 1947 4 Sheets-Sheet 1

INVENTOR.
RUDOLPH F. STEHLIK

BY *Chas. W. Candy*

ATTORNEY

April 17, 1951 R. F. STEHLIK 2,549,719

EXECUTIVE'S AND SECRETARY'S TRUNK CONNECTIVE INTERCOMMUNICATION AND SIGNAL SYSTEM

Filed Sept. 12, 1947 4 Sheets-Sheet 2

INVENTOR.

RUDOLPH F. STEHLIK

BY *Chas. W. Cordy*

ATTORNEY

April 17, 1951 R. F. STEHLIK 2,549,719

EXECUTIVE'S AND SECRETARY'S TRUNK CONNECTIVE INTERCOMMUNICATION AND SIGNAL SYSTEM

Filed Sept. 12, 1947 4 Sheets-Sheet 3

INVENTOR.
RUDOLPH F. STEHLIK

BY

Chas. Lu. Candy

ATTORNEY

INVENTOR.
RUDOLPH F. STEHLIK
BY Chas. M. Candy
ATTORNEY

Patented Apr. 17, 1951 2,549,719

UNITED STATES PATENT OFFICE 2,549,719

EXECUTIVE'S AND SECRETARY'S TRUNK CONNECTIVE INTERCOMMUNICATION AND SIGNAL SYSTEM

Rudolph Frank Stehlik, Antwerp, Belgium, assignor to Automatic Electric Laboratories, Inc., Chicago, Ill., a corporation of Delaware Application September 12, 1947, Serial No. 773,609

17 Claims. (Cl. 179—18)

The present invention relates in general to telephone systems and in particular to intercommunicating systems which enable a local connection between an executive and his secretary and connections between either of these two stations and the local exchange.

The invention is simple and compact in design yet entails a comprehensive system of signalling which enables both the executive and his secretary to tell at a glance the condititon of all of the lines available to them.

One of the objects of the invention is the provision of improved circuit means for enabling an executive to talk over one trunk line while holding a call on another trunk line or to talk to his secretary over a local connection while holding calls on either or both of the trunk lines.

Another object of the invention is an improved arrangement whereby the secretary is cut off from a trunk line over which the executive has established a connection.

A feature of the invention is the provision of both audible and visual signalling means which are operated in conjunction at different intervals to indicate either a calling line, a waiting line, or a busy line.

Figure 5:
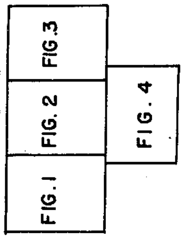

Other objects and features of the invention will become apparent upon a further persual of the specification taken in conjunction with the accompanying drawings which disclose the invention when arranged as shown in Figure 5 with adjoining lines abutting.

Figure 1:
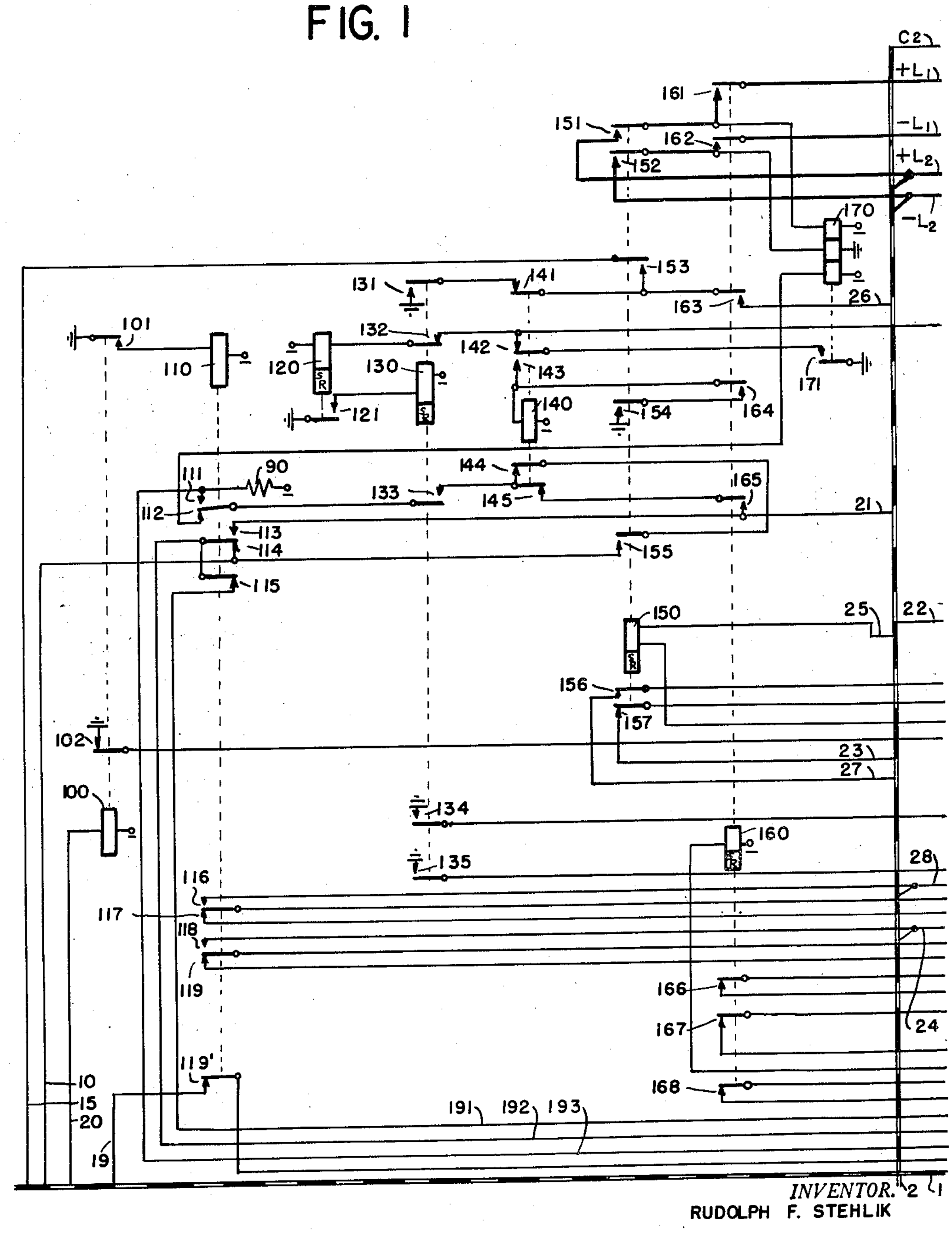
Figure 2:
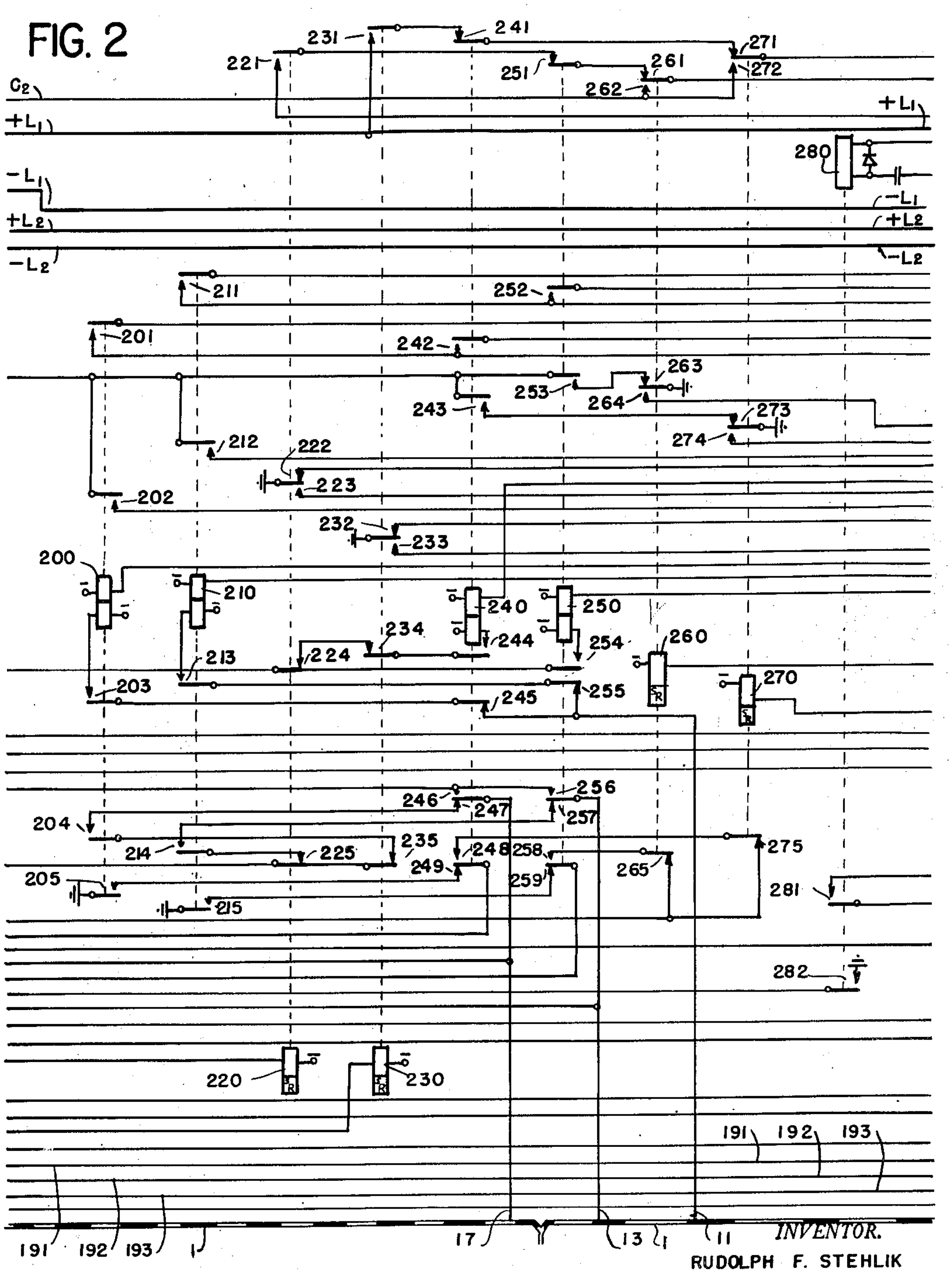
Figure 3:
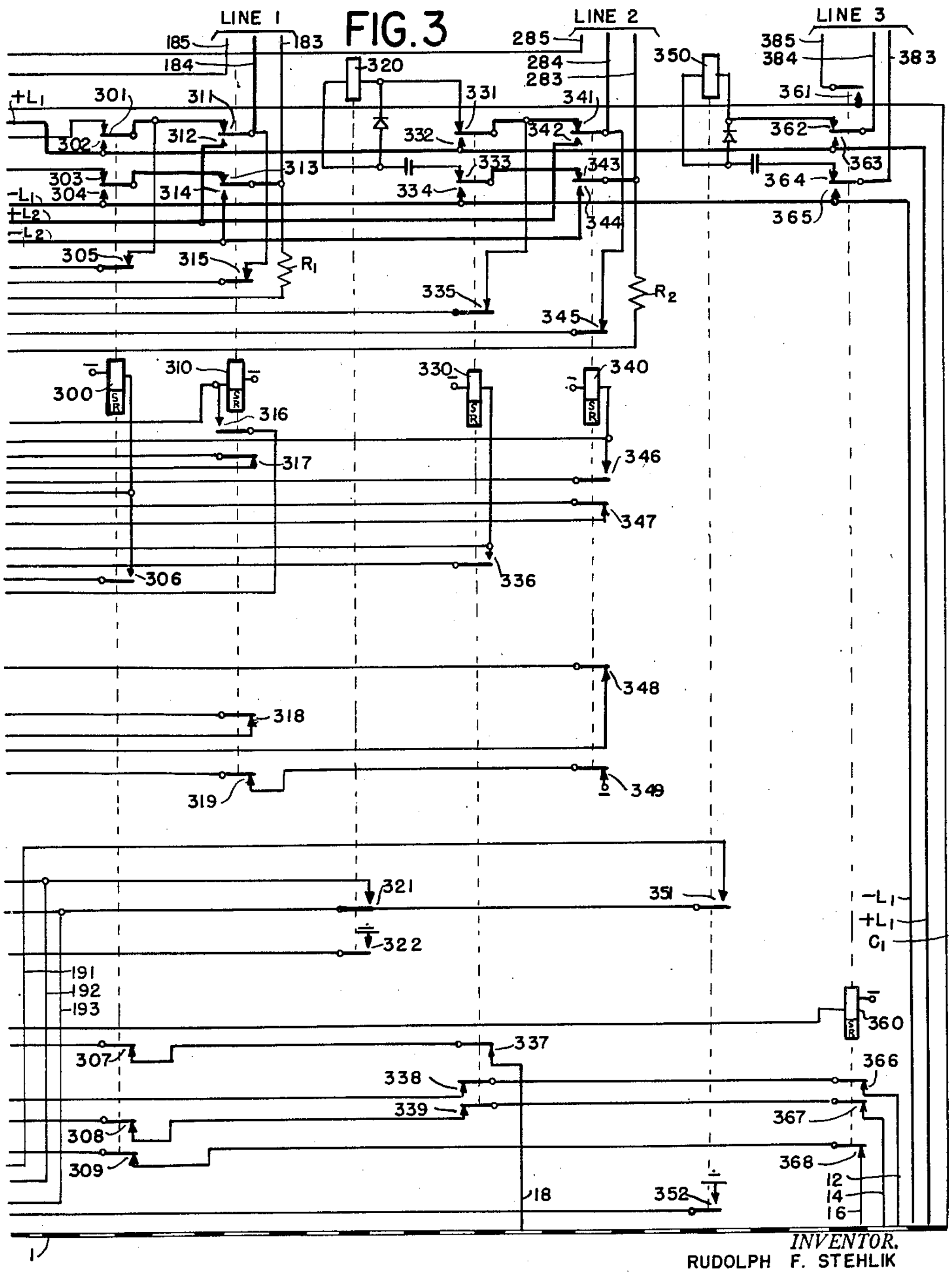
Figure 4:
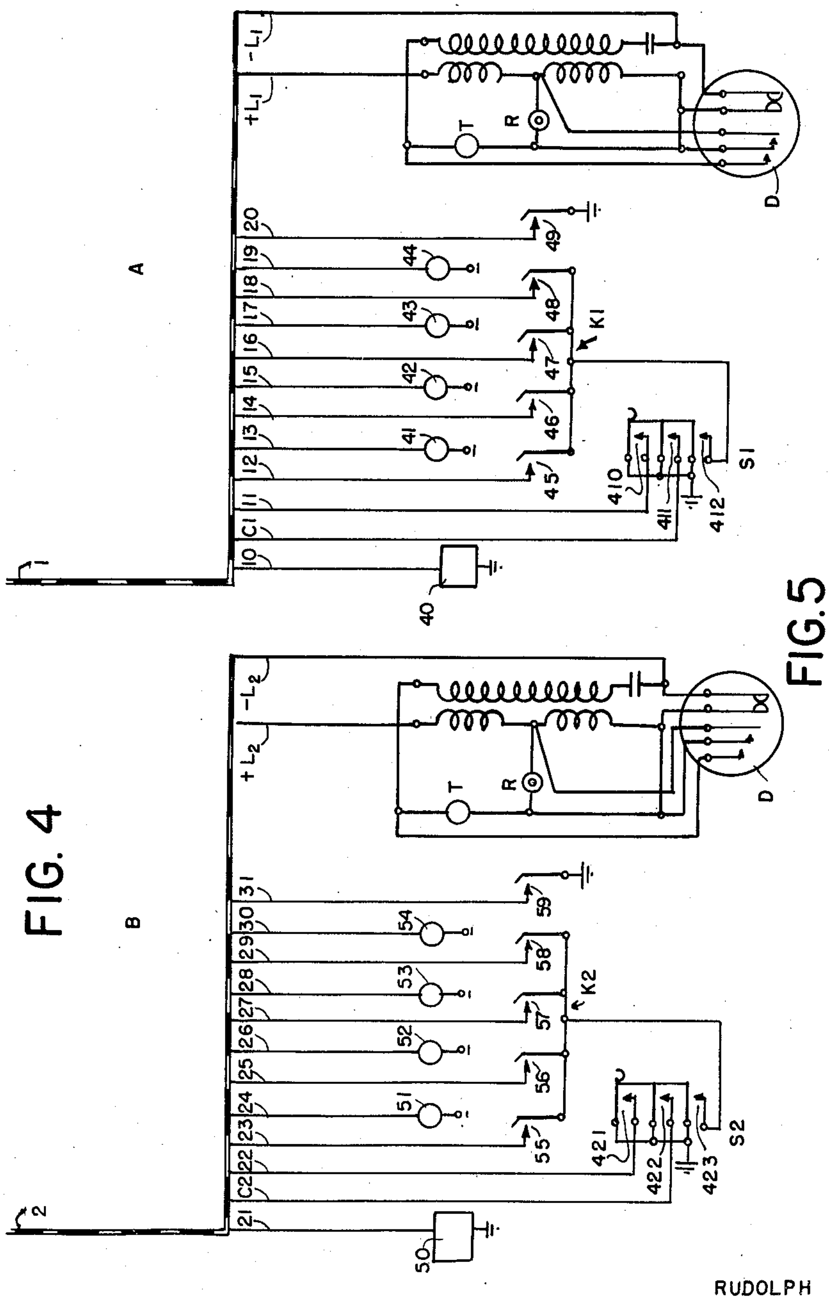

Figures 1 and 2 show control relays and circuits associated with the trunk lines and the two substations. Figure 3 shows three trunk lines, line 3 being a private trunk line to the secretary. Figure 4 shows the substation equipment of the executive represented by B and his secretary represented by A. The substation equipment is comprised of a telephone transmitter T and receiver R, dial mechanism D, hook switch (or cradle switch) $S_1$ and $S_2$, lamps 41—44, 51—54, and buzzers 40, 50. The invention anticipates the use of a substation telephone of the type disclosed in copending application Serial Number 773,110 filed September 10, 1947, now abandoned, having a five position rotary switch with lamps spaced around the arc described by the pointer knob of the rotary switch, each lamp corresponding to a particular position of said switch. It will be understood that the invention is not limited to the use of such a telephone but may be used with any conventional type of telephone providing it has a three spring hook or cradle switch. The five position control switch and associated lamps may be mounted in an operate unit or indeed the switch may be replaced by any kind of suitable switching means such as, for example, individual keys.

In order to better understand the invention, I will now explain the operation of the invention during a series of events as follows:

The secretary answers a call coming in over line #1 and informs the executive over the intercom connection that the call is for him. The executive answers the call over line 1 and during the conversation discovers that he needs certain information from another outside party. The executive then dials out over line 2 and attains the desired informatiton, all the while holding his original connection. The executive then completes his conversation over line 1 and releases both connections simultaneously.

Referring now to the drawings, the call coming in over line #1, conductors 183, 184, operates relay 280 on each cycle of ringing current in a well known manner. Relay 280 extends battery from resistance 90 (Figure 1), conductor 193, through contacts 281, conductor 192, contacts 114, conductor 10 of cable 1, to secretary's buzzer 40 and ground. Relay 280 also extends ground through contacts 282, 119, conductor 13 of cable 1 to secretary's lamp 41 and battery. Buzzer 40 and lamp 41 operate every time relay 280 operates in response to the receipt of ringing current over the calling line. The secretary responds to these signals by lifting her telephone handset and moving her switch $K_1$ to the position corresponding to lamp 41 thereby closing contacts 45. In lifting her telephone handset, the secretary operates the cradle switch $S_1$ thus closing contacts 410—412 and extending ground through contacts 412, 45, conductor 12 of cable 1, contacts 366, 338, 167, and the winding of relay 220 to battery. Relay 220 operates and opens a pulsing circuit to the secretary's lamp 43 at contacts 225, opens a locking circuit for relay 240 at contacts 224, and extends ground through contacts 223 and winding of relay 300 to battery. Relay 220 also connects the ground from contacts 411, through conductor C1 of cable 1, and contacts 221 to conductor 185 to thus busy line 1. Relay 300 bridges the secretary's phone across the calling line at contacts 302 and 304, opens a bridging circuit at contacts 305, extends its operating ground to the upper winding of relay 210 at contacts 306, and opens energizing circuits for relays 360, 160, and 230 at contacts 307, 308, and 309 respectively. Relay 210 prepares a line holding circuit at contacts 211, prepares a circuit to relay 120 at contacts 212, prepares a new energizing circuit for secretary's lamp 41 at contacts 214, energizes lamp 51 from ground at contacts 215 through contacts 259, conductor 24 of cable 2, and lamp 51 to battery, and locks up over its lower winding from battery, lower winding of relay 210, contacts 213, 225, conductor 11 of cable 1, and contacts 410 to ground. It will be noticed that the lamp 51, corresponding to line 1, is now energized by a steady current indicating the busy condition of line 1. It will also be realized that the secretary in answering the call, causes ringing current to be disconnected from the calling line in a well known manner thus causing relay 280 to remain deenergized and deenergizing her lamp 41 and buzzer 40.

The secretary finds that the call is for the executive and consequently moves her switch $K_1$ to the intercom position thereby opening contacts 45 and closing contacts 46. The opening of contacts 45 opens the energizing circuit of relay 220 which restores and prepares a pulsing circuit to secretary's lamp 41 at contacts 225, prepares a locking circuit for relay 240 at contacts 224, opens the energizing circuit of relay 300 at contacts 223, and completes an energizing circuit for relay 120 at contacts 222. Relay 300 restores and places a holding bridge including contacts 211 and resistance $R_1$ across line 1 at contacts 305, and disconnects secretary's phone from line 1 at contacts 302, and 304. Relay 120 operates from ground at contacts 222, through contacts 317, 212, 132, and winding of relay 120 to battery. Slow to release relay 120 and 130 form a pulsing circuit as follows: relay 120 operates relay 130 at contacts 121 and relay 130 opens the energizing circuit of relay 120 at contacts 132. Relay 120 restores after a slight delay and opens the energizing circuit or relay 130 at contacts 121. Relay 130 restores after a slight delay and re-energizes relay 120 at contacts 132 whereupon the cycle of operation keeps repeating itself. Everytime relay 130 operates it connects ground at contacts 134 through contacts 225, 214, 257, conductor 13 of cable 1, and secretary's lamp 41 to battery. Lamp 41 flashes at a rate dependant upon the natural cyclic period of operation of relays 120 and 130 thus indicating that line 1 is in a waiting condition. Relay 160 operates from ground at contacts 412, through contacts 46, conductor 14 of cable 1, contacts 367, 338, 308, and winding of relay 160 to battery. Relay 160 completes an energizing circuit for relay 170 at contacts 161 and 162, completes an energizing circuit for lamp 52 at contacts 163, completes an energizing circuit for buzzer 50 at contacts 165, and opens the circuits to relays 360, 220, and 230 at contacts 166, 167, and 168 respectively. Everytime relay 130 operates the lamp 52 flashes over the circuit from ground at contacts 131, through contacts 141, 163, conductor 26 of cable 2, and lamp 52 to battery. The buzzer also operates everytime relay 130 operates, from battery through the lower winding of relay 170, contacts 112, 133, 145, 165, conductor 21 of cable 2 and buzzer 50 to ground. The executive now has an audible signal that someone is calling and a visual signal that the calling party is his secretary calling over the intercom as indicated by the flashing of lamp 52. It will be noted that the upper and middle windings of relay 170 are bridged by the secretary's substation line (conductors $-L_1$ and $+L_1$) through contacts 161 and 162 hence relay 170 operates. Relay 170 furnishes an auxiliary operating ground at contacts 171 for the pulsing relays 120 and 130.

The executive responds to his secretary's call by moving his switch $K_2$ to the position corresponding to the lamp 52 thereby closing contacts 56, and by lifting his telephone handset thereby operating the cradle switch $S_2$ and closing contacts 421, 422, and 423. Relay 150 now operates from ground at contacts 423 through contacts 56, conductor 25 of cable 2, winding of relay 150, contacts 319, and 349 to battery. Relay 150 bridges the executive's speaking leads $+L_2$ and $-L_2$ across the secretary's speaking leads $+L_1$ and $-L_1$ at contacts 151 and 152, completes a circuit to relay 140 at contacts 154, and opens the circuits to relays 260 and 270 at contacts 156 and 157 respectively. Relay 140 operates from ground at contacts 154 through contacts 164, and winding of relay 140 to battery. Relay 140 opens an energizing circuit to secretary's lamp 42 at contacts 141 and opens the energizing circuit of lamp 52 at contacts 141 thus extinguishing lamp 52, locks up to ground from contacts 171 through contacts 143, opens a circuit to the secretary's buzzer 40 at contacts 144, opens the energizing circuit to buzzer 50 at contacts 145 thus silencing buzzer 50. The executive is now connected to his secretary over the local intercom line, talking battery for the connection being had through the upper windings of relay 170. At this time secretary's lamp 41 is flashing and boss's lamp 51 is steadily energized.

The executive, after talking with his secretary, desires to talk to the calling party on line 1 hence he moves his switch $K_2$ to the position corresponding to lamp 51 thereby opening contacts 56 and closing contacts 55. The opening of contacts 56 opens the energizing circuit of relay 150 thereby causing it to restore. In restoring, relay 150 removes the executive's speaking leads from across the secretary's speaking leads at contacts 151 and 152, opens the original energizing circuit of relay 140 at contacts 154, opens a point in a circuit to secretary's buzzer 40 at contacts 155, and closes points in the energizing circuits of relays 270 and 260 at contacts 156 and 157 respectively. If the secretary hangs up now, relays 160 and 170 will restore but we will assume, for the sake of illustration, that the secretary does not hang up immediately but instead, tries to listen in on the connection between the executive and the calling party on line 1. The closing of contacts 55 causes relay 260 to operate after relay 150 releases from ground at contacts 423 through contacts 55, conductor 23 of cable 2, contacts 157, 348, and winding of relay 260 to battery. Relay 260 completes a circuit to relay 310 at contacts 264, opens a circuit to the lamp 51 at contacts 265, and connects ground from conductor $C_2$ to conductor 185 at contacts 262 to busy line 1. Relay 310 connects the calling line (conductors 183 and 184) to the executive's speaking leads $-L_2$ and $+L_2$ at contacts 312 and 317, opens a point in a holding circuit at contacts 311 opens a point in another holding circuit at contacts 315, extends its operating ground to relay 250 at contacts 316, opens the energizing circuit of relay 120 at contacts 317, and opens further points in energizing circuits for relays 270 and 150 at contacts 318 and 319 respectively. Relays 120 and 130 restore thus extinguishing the secretary's lamp 41 at contacts 134. Relay 250 operates from ground at contacts 264 through contacts 316, and upper winding of relay 250 to battery. Relay 250 closes a point in a new holding circuit at contacts 252, closes a point in an energizing circuit for relay 120 at contacts 253, opens the locking circuit for relay 210 at contacts 255 to release relay 210, completes an energizing circuit for secretary's lamp 41 at contacts 256, prepares an energizing circuit for lamp 51 at contacts 258, and locks up over its lower winding from ground at contacts 421, through conductor 22 of cable 2, contacts 254, and lower winding of relay 250 to battery. The secretary's lamp 41 is now energized by a continuous current from ground at contacts 102 through contacts 256, conductor 13 of cable 1, and lamp 41 to battery. This steady light indicates to the secretary the busy condition of line 1.

Suppose now that the secretary tries to listen in on the conversation in which case she would move her switch $K_1$ to the position corresponding to lamp 41 thereby closing contacts 45. In closing contacts 45, relays 220, 300, and 210 will operate in a manner similar to their operation when the secretary originally answered the incoming call on line 1. Ordinarily the secretary's speaking leads $-L_1$ and $+L_1$ would be connected to conductors 183 and 184 of line 1 at contacts 302 and 304 but due to the operated condition of relay 310, contacts 302 and 304 are ineffective thus preventing the secretary from listening in on the connection between the boss and line 1. Even if the executive should move his switch $K_2$ to a new position resulting in the restoring of relay 310, (as will be explained hereinafter) the holding bridge including resistance $R_1$, contacts 252, and 315 which will bridge line 1 will prevent the secretary from talking in on line 1 because the holding bridge is connected across the line conductors of line 1 and contacts 302 and 304.

Let us go back to the time when the secretary has called the executive on the intercom line and he has answered her. At this time relays 210, 160, 150, 170, 140, and pulsing relays 120 and 130 are operated and secretary's lamp 41 is flashing everytime relay 130 operates. The holding bridge including contacts 305, 211, and resistance $R_1$ is holding the calling party on line 1. When the executive moves his switch to the position corresponding to line 1, relay 150 restores and relays 260, 310, and 250 operate as has been described. It will be realized that the aforementioned holding bridge is being maintained by relay 210 which is locked up over its lower winding to ground through the secretary's hook switch. If she should hang up before the executive operates relay 310 to bridge his subset across line 1, the connection would be released hence she waits until she gets a steady indication of her lamp 41 before hanging up thus assuring the maintenance of the holding bridge across line 1 until relay 310 has operated to substitute the executive's phone for this bridge. When the secretary hangs up, the cradle switch $S_1$ opens contacts 410, 411, and 412 thereby opening the energizing circuit for relay 160 which restores contacts 161 and 162 open the energizing circuit of relay 170 which restores and at contacts 171, opens the locking circuit for relay 140 which in turn restores.

Returning now to the condition where the executive is in conversation with the calling party during the course of which he discovers that he needs some information from another party which he desires to obtain without releasing the calling party on line 1. The executive now moves his switch $K_2$ to the position corresponding to line 2 thereby opening contacts 55 and closing contacts 57. The opening of contacts 55 opens the energizing circuit of relay 260 which restores and completes a circuit for the pulsing relays 120 and 130 at contacts 273, and completes a pulsing circuit to lamp 51 at contacts 265 which extends from ground at contacts 135 (everytime relay 130 operates) through contacts 265, 258, conductor 24 of cable 2, and lamp 51 to battery. The flashing lamp 51 indicates, as before, the waiting condition of line 1. Relay 260 also opens the energizing circuit of relay 310 at contacts 264 thus causing relay 310 to restore and connect a holding bridge including contacts 315, 252, and resistance $R_1$ across conductors 183 and 184, and disconnects the speaking leads $-L_2$ and $+L_2$ from across line 1 at contacts 312 and 314. Relay 270 now operates from ground at contacts 423, through contacts 57, conductor 27 of cable 2, contacts 156, 318, and winding of relay 270 to battery. Relay 270 connects ground to the control conductor 285 of line 2 at contacts 272 as follows; ground at contacts 422 of cradle switch $S_2$, conductor $C_2$ of cable 2 and contacts 272 to conductor 285. Relay 270 also completes an obvious circuit for relay 340 at contacts 274, and opens a circuit to lamp 53 at contacts 275. Relay 340 operates and connects the executive's speaking leads $-L_2$ and $+L_2$ to conductors 283 and 284 of line 2 at contacts 342 and 344. This looping of line 2 by the executive's substation starts the operation of well known succeeding switches to permit the extension of a call from the instant station to any other subscriber local or otherwise. The ground applied to conductor 285 by relay 270, busies line 2 to incoming calls. Relay 340 also opens a point in a holding bridge at contacts 345, extends its operating ground to relay 240 at contacts 346, opens a circuit to relay 260 at contacts 348, and opens a circuit to relay 150 at contacts 349. Relay 240 operates from ground at contacts 274 through contacts 346, and upper winding of relay 240 to battery. Relay 240 prepares a holding bridge circuit for line 2 at contacts 242, prepares an auxiliary operating circuit for pulsing relays 120 and 130, opens the locking circuit for relay 200 at contacts 245, completes a circuit for secretary's lamp 43 at contacts 246, and prepares a circuit for lamp 53 at contacts 248. The secretary's lamp 43 is now steadily energized over the circuit from ground at contacts 102 through contacts 246, conductor 17 of cable 1, and lamp 43 thus indicating the busy condition of line 2. The executive may now operate his dial mechanism $D_2$ to call the desired party as soon as he receives dial tone from the subsequent switch train.

Upon completing his conversation with the called party, the executive desires to impart the information he has received from the called party on line 2 to the calling party on line 1. The executive consequently, without replacing his telephone handset, moves his switch $K_2$ to the position corresponding to line 1 thereby opening contacts 57 and closing contacts 55. Contacts 57 open the energizing circuit of relay 270 which restores causing relay 340 to restore at contacts 274 and completing a pulsing circuit to lamp 53 at contacts 275. Relay 340 disconnects the speaking leads $-L_2$ and $+L_2$ from across line 2 at contacts 342 and 344 and connects a holding bridge across line 2 which includes resistance $R_2$, contacts 242, and 345. Lamp 53 is energized from ground at contacts 135 (everytime relay 130 operates) through contacts 275, 248, conductor 28 of cable 2, and lamp 53 to battery. The closing of contacts 55 completes an energizing circuit for relay 260 from ground at contacts 423 through contacts 55, conductor 23 of cable 2, contacts 157, 348, and winding of relay 260 to battery. Relays 260, and 310 operate in the same manner as they did when the executive first answered the call on line 1 only in this case relay 250 is already locked energized from ground supplied from contacts 421 of cradle switch $S_2$. The executive's speaking leads $-L_2$ and $+L_2$ are again connected to conductors 183 and 184 of line 1 at contacts 312 and 314 and the holding bridge for line 1 has been opened at contacts 315 by the operation of relay 310. It will be noted that the pulsing circuit to lamp 51 is opened at contacts 265 by the operation of relay 260. Briefly, at this time, we have secretary's lamps 41 and 43 steadily energized from ground at contacts 102, lamp 53 is flashing everytime relay 130 operates, and relays 260, 310, 250, 240, and pulsing relays 120 and 130 are operated.

Upon the completion of his conversation with the calling party on line 1, the executive will release both lines 1 and 2 by replacing his telephone handset thereby operating his cradle switch $S_2$ to open contacts 421, 422, and 423. The opening of contacts 421 opens the locking circuit for relays 240 and 250 which now restore. Relay 250 opens the energizing circuit for lamp 41 at contacts 256. Relay 240 opens the energizing circuit for lamp 43 at contacts 246, and for lamp 53 at contacts 248. Relay 240 also opens the energizing circuit for pulsing relays 120 and 130 at contacts 243. The opening of contacts 423 opens the energizing circuit of relay 260 thereby causing it to restore. Relay 260 opens the energizing circuit of relay 310 at contacts 264, causing relay 310 to restore and disconnect the executive's speaking leads from across line 1 at contacts 312 and 314. The closing of contacts 315 are ineffective, in this case, to place the holding bridge across line 1, because of the open condition of contacts 252. The entire system is now at normal ready to receive or extend any new calls.

It will be realized that a call coming in on line 2 would be handled in a similar manner to the way in which the call coming in on line 1 was handled as has just been described. In the case of line 2 calling, relay 320 would operate on every ring cycle to signal the secretary by operating her lamp 43 and buzzer 40. The secretary, in answering the call, would operate relays 230, 330, and 200 which is analogous to the operation of relays 220, 300, and 210 as has been previously explained. The transfer of the call to the executive is the same as for the first case as is the final release of the connection.

It will be further realized that either the executive or his secretary may call each other and converse over the intercom connection irrespective of the condition of the trunk lines. If the executive desires to call his secretary he lifts his telephone handset and moves switch $K_2$ to the intercom position thereby closing contacts 421, 422, 423, and 56. Relay 150 operates from ground at contacts 423 through contacts 56, conductor 25 of cable 2, winding of relay 150, contacts 319 and 349 to battery. Relay 150 bridges the executive's substation across the upper and middle windings of relay 170 at contacts 151 and 152, prepares a circuit to secretary's lamp 42 at contact 153, prepares an energizing circuit for relay 140 at contacts 154, and prepares a circuit for secretary's buzzer 40 at contacts 155. Relay 170 operates over the executive's substation loop in an obvious manner, and completes an obvious start circuit for the pulsing relays 120 and 130 at contacts 171. Everytime relay 130 operates it completes an energizing circuit for lamp 42 from ground at contacts 131, through contacts 141, 153, conductor 15 of cable 1 and lamp 42 to battery. Relay 130 also completes a circuit for buzzer 40 at contacts 133. This circuit may be traced from battery through the lower winding of relay 170, contacts 112, 133, 144, 155, conductor 10 of cable 1, and buzzer 40 to ground. Everytime buzzer 40 operates the executive hears a buzzer tone through the medium of the inductive coupling furnished by the windings of relay 170. This tone indicates that his secretary is at her desk. The absence of the tone would tell him that the secretary has operated her "away from desk switch" as will be hereinafter explained. The secretary responds to these signals by lifting her telephone handset and moving switch $K_1$ to the position corresponding to lamp 42 thereby closing contacts 410, 411, 412, and 46. Relay 160 now operates from ground at contacts 412 through contacts 46, conductor 14 of cable 1, contacts 367, 339, 308, and winding of relay 160 to battery. Relay 160 connects the secretary's speaking leads $-L_1$ and $+L_1$ to the executive's speaking leads $-L_2$ and $+L_2$ at contacts 161 and 162, and completes an obvious energizing circuit for relay 140 at contacts 164. Relay 140 opens the start circuit for pulsing relays 120 and 130 at contacts 142, locks up to ground at contacts 171 through contacts 143, and opens the energizing circuits for lamp 42 and buzzer 40 at contacts 141 and 144 respectively. The conversation between executive and secretary may now take place, talking battery being had through the upper and middle windings of relay 170. The intercom connection is released in an obvious manner when both parties have hung up or moved their control switches to different positions.

Consider now the operation of the system when a call comes in on line 3 which is a private line to the secretary. Relay 350 operates on every ring cycle in a well known manner thereby connecting ground at contacts 352 through contacts 119', conductor 19 of cable 1, and lamp 49 to battery. Relay 350 also completes a circuit for secretary's buzzer 40 at contacts 351 as follows: from battery at resistance 90, (Figure 1) through conductor 193, contacts 351, conductor 191, contacts 115, 114, conductor 10 of cable 1, and buzzer 40 to ground. The secretary responds to these signals by moving her switch $K_1$ to the position corresponding to line 3 thereby closing contacts 48 and by removing her telephone handset thereby operating cradle switch $S_1$ to close contacts 410, 411, and 412. Thus ground from contacts 412 is extended to relay 360 through contacts 48, conductor 18 of cable 1, contacts 337, 307, 166, and winding of relay 360 to battery. Relay 360 operates thus connecting the secretary's speaking leads $-L_1$ and $+L_1$ to conductors 383 and 384 of line 3 at contacts 363 and 365 and busying line 3 to other incoming calls by grounding control conductor 385 at contacts 361 as follows; from ground at contacts 411 through conductor $C_1$ of cable 1 and contacts 361 to conductor 385. Relay 360 also opens the energizing circuits for relays 220, 160, and 230 at contacts 366, 367, and 368 respectively. While no holding bridge is shown for line 3, it is to be understood that such a bridge may be easily provided in a manner similar to the holding bridges shown for lines 1 and 2. The connection will be released when the secretary replaces here telephone handset thereby opening the energizing circuit for relay 360 at contacts 412 thus returning the system to normal.

The secretary may call out on her private line by operating switch $K_1$ in the same manner as for answering a call on line 3, in which case relay 360 bridges the secretary's substation across line 3 thereby starting the succeeding switch train operation in a familiar manner.

The secretary's switch $K_1$ is provided with an "away from desk" position which when operated closes contacts 49. This position of the switch conditions the equipment so that an incoming call on either line 1 or 2 will signal the executive directly. Let us consider now the case where the secretary has moved her switch to the "away from desk" position and a call comes in over line 2. The closing of contacts 49 extends ground through conductor 20 of cable 1 and the winding of relay 100 to battery. Relay 100 opens an energizing circuit for secretary's lamps 41 and 43 at contacts 102 and completes an obvious energizing circuit for relay 110 at contacts 101. Relay 110 transfers the operating battery for the buzzers from the lower winding of relay 170 to the circuit including resistance 90, transfers an operating circuit for secretary's buzzer to the executive's buzzer at contacts 113, and 114, opens the circuit to the secretary's buzzer at contacts 115, transfers the operating circuits for secretary's lamps 41 and 43 to the executive's lamps 51 and 53 at contacts 116 and 118, and opens the circuit to secretary's lamp 44 at contacts 119'. Relay 320 operates on every ring cycle over the calling line in a now familiar manner, and connects ground at contacts 322 through contacts 116, conductor 23 of cable 2, and lamp 53 to battery. Relay 320 also completes a circuit to the buzzer 50 at contacts 321 as follows; from battery at resistance 90 (Figure 1) through conductor 193, contacts 321, conductor 192, contacts 113, conductor 21 of cable 2, and buzzer 50 to ground. Buzzer 50 and lamp 53 thus operate everytime relay 320 operates thereby indicating to the executive the calling condition of line 2. The executive answers the call by removing his handset and by moving switch $K_2$ to the position corresponding to line 2 thereby operating relays 270, 340, and 240 as has been previously explained. The connection is released in a hereinbefore described manner when the executive operates the cradle switch by replacing his telephone handset.

Suppose now, that the secretary has operated her "away from desk switch" and the executive attempts to call her over the intercom connection. The executive lifts his telephone handset from the cradle and moves switch $K_2$ to the intercom position thereby closing contacts 421, 422, 423, and 56. Relay 150 now operates from battery at contacts 349 (Figure 3) through contacts 319, winding of relay 150, conductor 25 of cable 2, contacts 56 and 423 to ground. Relay 150 bridges the executive's speaking leads $-L_2$ and $+L_2$ across the upper and middle windings of relay 170 at contacts 151 and 152 thereby causing relay 170 to operate. Relay 170 completes an obvious start circuit for the pulsing relays 120 and 130 at contacts 171. Everytime relay 130 operates, it completes a circuit for the secretary's buzzer at contacts 133 and 155. This circuit may be traced from battery at resistance 92 through contacts 111, 133, 144, 155, conductor 10 of cable 1 and buzzer 40 to ground. Interrupter relay 130 at contacts 131 completes a circuit by way of contacts 141 and 153, conductor 15 of cable 1, and lamp 42 to battery to flash lamp 42. Ordinarily, the battery for operating the secretary's buzzer when the executive is calling over the intercom connection, comes from the lower winding of relay 170 through contacts 112 thus giving the executive a tone indication, through the inductive coupling furnished by the winding of relay 170, everytime buzzer 40 operates. In the present case, however, the operating battery for buzzer 40 is fed through resistance 90 and contacts 111 hence the executive will not receive a tone indication and he will therefore know that the secretary has operated her "away from desk" switch.

A call coming in over the secretary's private line, line 3, will not operate any signaling devices at either substation due to the open position of contacts 119' and 115.

For the sake of simplicity I have not shown any utility for executive's lamp 54 and switch contacts 58 and 59. It is to be understood that these devices may be used in a number of ways. For instance lamp 54 and contacts 58 might be used for a private line to the executive in the same way as lamp 44 and contacts 48 are used for the secretary's private line. Contacts 59 might be used to signal to the secretary that the executive does not wish to be disturbed or for summoning a subordinate to the executive's office, etc.

Certain of the relays in this invention such as, for example, relays 260, 270, 300, 310 etc., have been made slow to release by the addition of a copper slug around the armature end of the relay. It is a characteristic of this type of relay that it is also slightly slow to operate. The reason for these slugged relays is to prevent false signalling and false connections. Suppose that the executive is holding a call on line 2 while talking on line 1. In this case relays 260, 310, and pulsing relays 120 and 130, among others, are operated. Now the executive switches over to connect with the waiting line 2. If he should pause momentarily at the intercom position, which lies between the line 1 and line 2 positions, relay 150 would operate to signal the secretary if it were not for the fact that relays 260 and 310 are slow to release and relay 150 cannot operate until relay 310 releases because of contacts 319. Relays 220, 230, 260, and 210 are also slightly slow to operate so that the very slight period that the contacts for operating these relays are closed during the normal turning of switch $K_2$ to another position will not be long enough to operate these relays. This feature is part of a general interlock system which prevents one person from operating two trunk connecting relays at one time. Take again, for instance, the case where the executive is holding a call on line 2 while talking on line 1 in which case trunk connect relay 310 is operated. Now when the executive desires to return to the party on line 2 he will move his switch $K_2$ so as to operate relay 270 which in turn will operate trunk connect relay 340. Relay 270 however, cannot operate until trunk connect relay 310 restores because of contacts 318. Thus we see that trunk connect relays 310 and 340 cannot be operated at the same time for if they were the two lines 1 and 2 would be cross connected. The same, of course, is true for the trunk connect relays controlled by the secretary, namely relays 300, 330, and 360.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a telephone system, a plurality of subscribers' stations, a plurality of trunk lines common to said stations, visual signaling means individual to each of said trunk lines at each of said stations, means responsive to a calling one of said trunk lines for operating the signal means individual thereto at a particular rate and at only a particular one of said stations, and means operated at said particular station after the operation of said signaling means for causing the signaling means at another one of said stations which is also individual to said calling trunk to operate at a different rate.

2. In a telephone system, a first subscriber's substation and a second subscriber's substation, a plurality of trunk lines common to both of said substations, a plurality of signaling means at both of said substations each being individual to one of said trunk lines, means responsive to a call on one of said trunk lines for operating the signaling means individual thereto only at said first substation and means operated at said first substation for causing said first substation to be connected to said calling trunk line and for operating the signaling means individual to said calling trunk line at said second substation.

3. In a telephone system including first and second subscribers' stations and a plurality of trunk lines common thereto, a plurality of visual signaling devices located at each of said stations, each of said signaling devices being associated with a particular one of said trunk lines, means for communicatively connecting said stations over a local connection, means responsive to a call on one of said trunk lines for operating the signal device associated therewith at a particular rate but only at said first station, means controlled from said first station for causing said first station to be connected to said calling trunk, other means controlled by said third means for causing the signal device at said second station associated with said calling trunk to operate at a different rate, and contact means for controlling said second means to restore said first operated signaling device when said third means is operated by the subscriber at said first station.

4. In a telephone system including first and second subscribers' stations and a plurality of trunks common thereto, each of said stations being provided with a signaling device individual to each of said trunk lines, means operable from either of said stations for communicatively connecting said stations over a local connection, means responsive to a call on one of said trunk lines for operating the signal device associated therewith at one particular rate but only at said first station, means controlled from said first station for connecting said first station to said calling trunk line, means controlled by said third means for operating the signaling device at said second station individual to said calling trunk line at a different rate, means operative at said first station for operating said first operated signaling device at a still different rate, other means controlled from said second station for connecting said second station with said calling trunk line, and means for causing said first operated signaling device to operate at said different rate in response to the operation of said other means.

5. In a telephone system including first and second subscribers' stations having a trunk line common thereto, trunk line signaling means at each of said stations individual to said trunk line, said trunk line signaling means normally operated only at said first station responsive to an incoming calling condition of said trunk line, control means controlled from said first station for conditioning said system so that only the trunk line signaling means at said second station will operate responsive to an incoming calling condition of said trunk line, means for establishing a local connection between said stations over an interoffice line, audible signalling means at each of said stations individual to said interoffice line and means including a relay controlled from said second station for operating said audible signalling means at said first station, the operation of which is normally made audible to the subscriber at said second station through the inductive coupling of the windings of said relay but being made inaudible to the subscriber at said second station when said control means is operated.

6. In a telephone system including a secretary's substation and an executive's substation, a plurality of trunk lines common to said substations, each of said substations being provided with a lamp individual to each of said trunk lines, a relay intermittently operated at a particular rate in response to a call on one of said trunk lines, the lamp individual to said calling trunk line only at said secretary's substation operating in response to each operation of said relay, a switch manually operated by the secretary to a particular position in response to the operation of said operated lamp, and a second relay operating in response to the operation of said switch to said particular position for causing the lamp at said executive's substation individual to said calling trunk to operate at a rate different from the operating rate of said first operated lamp.

7. In a telephone system including a secretary's substation and an executive's substation, a plurality of trunk lines common to said substations, each of said substations being provided with a lamp individual to each of said trunk lines, a relay intermittently operated at a particular rate in response to a call on one of said trunk lines, only the lamp at said secretary's substation individual to said calling trunk line operating in response to each operation of said relay, a switch manually operated to a particular position in response to the operation of said operated lamp, two relays operating in response to the operation of said switch to said particular position for causing said secretary's substation to be connected to said calling trunk line, and a fourth relay operated in response to the operation of said switch to said particular position for causing the lamp at said executive's substation individual to said calling trunk line to operate at a rate different from the operating rate of said first operated lamp.

8. In a telephone system including a secretary's substation and an executive's substation, a plurality of trunk lines common to said substations, each of said substations being provided with a lamp individual to each of said trunk lines, said secretary's substation also being provided with a manually operable switch, means responsive to the operation of said switch to a first position for initiating a local connection between said substations, a relay connected to one of said trunk lines and intermittently operated at a particular rate in response to a call on said one of said trunk lines, means controlled by said relay for operating only the lamp at said secretary's substation individual to said calling trunk line in response to each operation of said relay, said switch manually operated to a second position corresponding to the operation of said operated lamp, two relays, means effective in response to the operation of said switch to said second position for operating said two relays, contact means for connecting said secretary's substation to said calling trunk line in response to the operation of said two relays, a third relay, means for operating said third relay in response to the operation of said two relays, means for causing the lamps at said executive's substation individual to said calling trunk line to operate at a rate different from the operating rate of said first operated lamp in response to the operation of said third relay, said two relays deenergized responsive to the manual operation of said switch from said second position to said first position, interrupter means, means for operating said interrupter means in response to the deenergization of said two relays, and means controlled by said interrupter means for causing said first operated lamps to operate at a still different rate.

9. In a telephone system as claimed in claim 8 in which said executive's substation is provided with a manually operable switch operated to a particular position corresponding to the operation of said operated lamp at said executive's substation, a pair of relays, means for operating said pair of relays in response to the operation of said second switch to said particular position, means for causing said executive's substation to be connected to said calling trunk line in response to the operation of said pair of relays, a further relay, means for operating said further relay in response to the operation of said pair of relays, means for extinguishing said operated lamp at said executive's substation in response to the operation of said further relay, and means for causing said first operated lamp to operate at said different rate in response to the operation of said further relay.

10. In a telephone system including a secretary's substation and an executive's substation, a plurality of trunk lines common to said substations, a manually operable switch at said secretary's substation, means responsive to the operation of said switch to a first position for initiating a local connection between said substations, two relays, means for operating said two relays responsive to the operation of said switch to a second position, means for connecting said secretary's substation to a particular one of said trunk lines in response to the operation of said two relays, a holding bridge circuit for said particular trunk line, a third relay, means for operating said third relay responsive to the operation of said two relays, means for preparing said holding bridge circuit for said particular trunk in response to the operation of said third relay, said two relays deenergized responsive to the operation of said switch from said second position to said first position, and means for completing said holding bridge circuit in response to the deenergization of said two relays.

11. In a telephone system as claimed in claim 10 in which said executive's substation is provided with a manually operable switch, a pair of relays, means for operating said pair of relays responsive to the operation of said executive switch to a particular position, means for causing said executive's substation to be connected to said particular trunk line in response to the operation of said pair of relays, and means controlled by said pair of relays to prevent said secretary's substation from reestablishing a connection with said particular trunk line.

12. In a telephone system as claimed in claim 10, a manually operable switch at said executive's substation, a pair of relays, means for operating said pair of relays responsive to the operation of said executive switch to a particular position, means operated responsive to the operation of said pair of relays for causing said executive's substation to be connected to said particular trunk line, a sixth relay, means for operating said sixth relay in response to the operation of said pair of relays, means operated responsive to the operation of the sixth relay for preparing said holding bridge circuit for said particular trunk line, said pair of relays deenergized responsive to the operation of said executive switch to a different position, and means for completing said holding bridge circuit responsive to the deenergization of said pair of relays.

13. In a telephone system, a subscriber's substation, a trunk line, a visual signal at said substation individual to said trunk line, signalling means responsive to an incoming call received over said trunk line for flashing said signal at a predetermined rate, answer means responsive to the subscriber at said substation answering the trunk call for connecting said substation to said trunk line, contact means controlled by the operation of said answer means for controlling said signalling means to extinguish said signal, an incomplete holding bridge for said trunk line, other means for enabling said subscriber to control said answer means to disconnect his substation from said trunk line, further contact means operated to complete said holding bridge for said trunk line in response to the operation of said other means, flashing means operated to flash said signal at a different predetermined rate in response to the operation of said other means, additional means including a second subscriber's line for connecting said second subscriber's line with said trunk line, contact means operated by said additional means for removing said holding bridge, and contact means responsive to the operation of said additional means for maintaining said signal illuminated.

14. In a telephone system, a first subscriber's line, a second subscriber's line, a trunk, a first visual signal individual to said trunk and individual to said first line, a second visual signal individual to said trunk and individual to said second line, signalling means responsive to an incoming call received over said trunk for flashing only said first signal at a predetermined rate, answer means responsive to the first subscriber answering said trunk call for connecting said first subscriber line to said trunk, contact means for controlling said signalling means to extinguish said first signal in response to the operation of said answer means, other contact means responsive to the operation of said answer means for steadily illuminating said second signal, an incomplete holding bridge for said trunk line, additional means for enabling said first subscriber to control said answer means to disconnect said first line from said trunk, a circuit closed responsive to the operation of said additional means to complete said holding bridge, flashing means operated by said answer means and said additional means to flash said first signal at a different predetermined rate, means for signalling the second subscriber in response to the operation of said additional means, further means for enabling said second subscriber to connect with said trunk, means controlled by said further means to remove said holding bridge from said trunk, means operated by said further means to extinguish said second signal, and controlled by said further means to maintain said first signal illuminated.

15. In a telephone system, a subscriber's line, a first and a second trunk, a first trunk relay individual to said first trunk for connecting said first trunk to said line, a second trunk relay individual to said second trunk for connecting said second trunk to said line, a first control relay for controlling the operation of said first trunk relay, a second control relay for controlling the operation of said second trunk relay, a circuit for energizing said first control relay including contacts on said second trunk relay and contacts individual to said trunk at said line, and a circuit for energizing said second control relay including contacts on said first trunk relay and contacts individual to said second trunk at said line.

16. In a telephone system, a subscriber substation, relay switching apparatus associated with said substation, an intercommunication line and a first and second trunk terminating in said apparatus, an intercom relay in said apparatus for connecting said line to said station, a first trunk relay in said apparatus for connecting said first trunk to said station, a second trunk relay in said apparatus for connecting said second trunk to said station, a circuit for energizing said intercom relay including contacts on said first and second trunk relays and contacts individual to said line at said substation; circuit means for energizing said first trunk relay including contacts on said intercom relay, contacts on said second trunk relay and contacts individual to said first trunk at said substation; and circuit means for energizing said second trunk relay including contacts on said intercom relay, contacts on said first trunk relay and contacts individual to said second trunk at said substation.

17. In a telephone system, first and second subscriber substations, relay switching apparatus associated with said substations, an intercommunication line and first and second trunks terminating in said apparatus, an intercom relay for each substation in said apparatus for interconnecting said substations over said line, a first trunk relay in said apparatus individual to said first substation and to said first trunk for connecting said first trunk to said first substation, a second trunk relay in said apparatus individual to said first station and to said second trunk for connecting said second trunk to said first substation, a third trunk relay in said apparatus individual to said second substation and to said first trunk for connecting said first trunk to said second substation, a fourth trunk relay in said apparatus individual to said second substation and to said second trunk for connecting said second trunk to said second substation, a circuit for energizing the first of said intercom relays including contacts on said first and second trunk relays and contacts at said first substation individual to said line; a circuit for energizing the second of said intercom relays including contacts on said third and fourth trunk relays and contacts at said second substation individual to said line; circuit means for energizing said first trunk relay including contacts on the first of said intercom relays, contacts on said second trunk relay, and contacts individual to said first trunk at said first substation; circuit means for energizing said second trunk relay including contacts on the first of said intercom relays, contacts on said first trunk relay, and contacts individual to said second trunk at said first station; circuit means for energizing said third trunk relay including contacts on the second of said intercom relays, contacts on said fourth trunk relay and contacts individual to said first trunk at said second substation; circuit means for energizing said fourth trunk relay including contacts on the second of said intercom relays, contacts on said third trunk relay and contacts individual to said second trunk at said second substation; contacts on said third trunk relay operated in response to the energization of said third trunk relay for disconnecting said first substation from said first trunk in case said first station is connected thereto, and contacts on said fourth trunk relay operated in response to the energization of said fourth trunk relay for disconnecting said first substation from said second trunk in case said first substation is connected thereto.

RUDOLPH FRANK STEHLIK.

REFERENCES CITED

The following references are of record in the file of this patent:

UNITED STATES PATENTS

| Number | Name | Date |
|---|---|---|
| 2,027,197 | Powell | Jan. 7, 1936 |
| 2,095,712 | Peterson | Oct. 12, 1937 |
| 2,303,015 | Beaumont | Nov. 24, 1942 |
| 2,374,072 | Beaumont | Apr. 17, 1945 |